A. G. BOOZER, Jr. & G. HILL.
DOFFING MACHINE.
APPLICATION FILED JUNE 20, 1913.

1,142,748.

Patented June 8, 1915.
7 SHEETS—SHEET 1.

Witnesses.
Inventors
Arthur Geo. Boozer Jr
and
George Hill
By Luther L. Miller
Attorney.

A. G. BOOZER, Jr. & G. HILL.
DOFFING MACHINE.
APPLICATION FILED JUNE 20, 1913.

1,142,748.

Patented June 8, 1915.
7 SHEETS—SHEET 7.

Witnesses

Inventors
Arthur Geo. Boozer Jr.
and
George Hill.
By Luther L. Miller
Attorney.

UNITED STATES PATENT OFFICE.

ARTHUR GEORGE BOOZER, JR., OF GREENVILLE, AND GEORGE HILL, OF TUCAPAU, SOUTH CAROLINA, ASSIGNORS TO HOWARD D. COLMAN, LUTHER L. MILLER, AND HARRY A. SEVERSON, DOING BUSINESS AT ROCKFORD, ILLINOIS, AS BARBER-COLMAN COMPANY.

DOFFING-MACHINE.

1,142,748. Specification of Letters Patent. Patented June 8, 1915.

Application filed June 20, 1913. Serial No. 774,742.

*To all whom it may concern:*

Be it known that we, ARTHUR GEORGE BOOZER, Jr., and GEORGE HILL, citizens of the United States, residing, respectively, at Greenville, county of Greenville, and Tucapau, county of Spartanburg, in the State of South Carolina, have invented certain new and useful Improvements in Doffing-Machines, of which the following is a specification.

This invention relates to doffing machines arranged to travel along the sides of spinning frames for removing full bobbins from the spindles and replacing empty bobbins thereon.

The machine herein disclosed is similar to that shown in our prior applications Serial Nos. 401,308, filed November 8, 1907, 483,821, filed March 16, 1909, 485,001, filed March 22, 1909 and 621,317, filed April 15, 1911.

One of the objects of the present invention is to provide an improved mechanism for actuating and controlling the machine.

Another object is to provide an improved magazine for empty bobbins and means for controlling the passage of the bobbins from said magazine onto the empty spindles.

The invention also relates to other improvements and advantages to be more fully described hereinafter.

In the accompanying drawings, Figures 1 and 2 together constitute a front elevation of a doffing machine embodying our invention, the view also showing portions of a spinning frame with which the doffing machine is associated.

The preferred embodiment of our invention which we have herein illustrated comprises a suitable framework consisting of two sides 20, a base 21 connecting the lower ends of said sides, and a table 22 mounted upon and connecting the upper ends of said sides. The machine is supported upon a guide rail 23 on the spinning frame A, by means of a pair of grooved rollers 24 mounted eccentrically in bearing brackets 25 secured to the sides 20.

Figure 2:
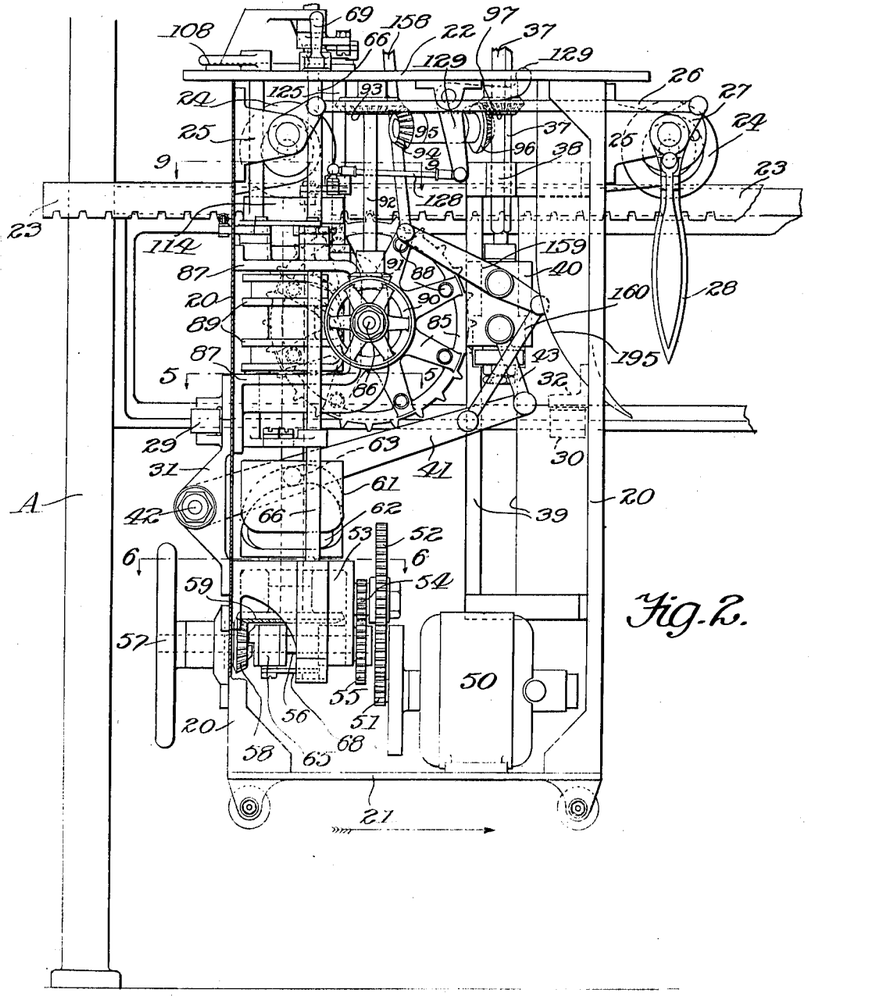
Figure 3:
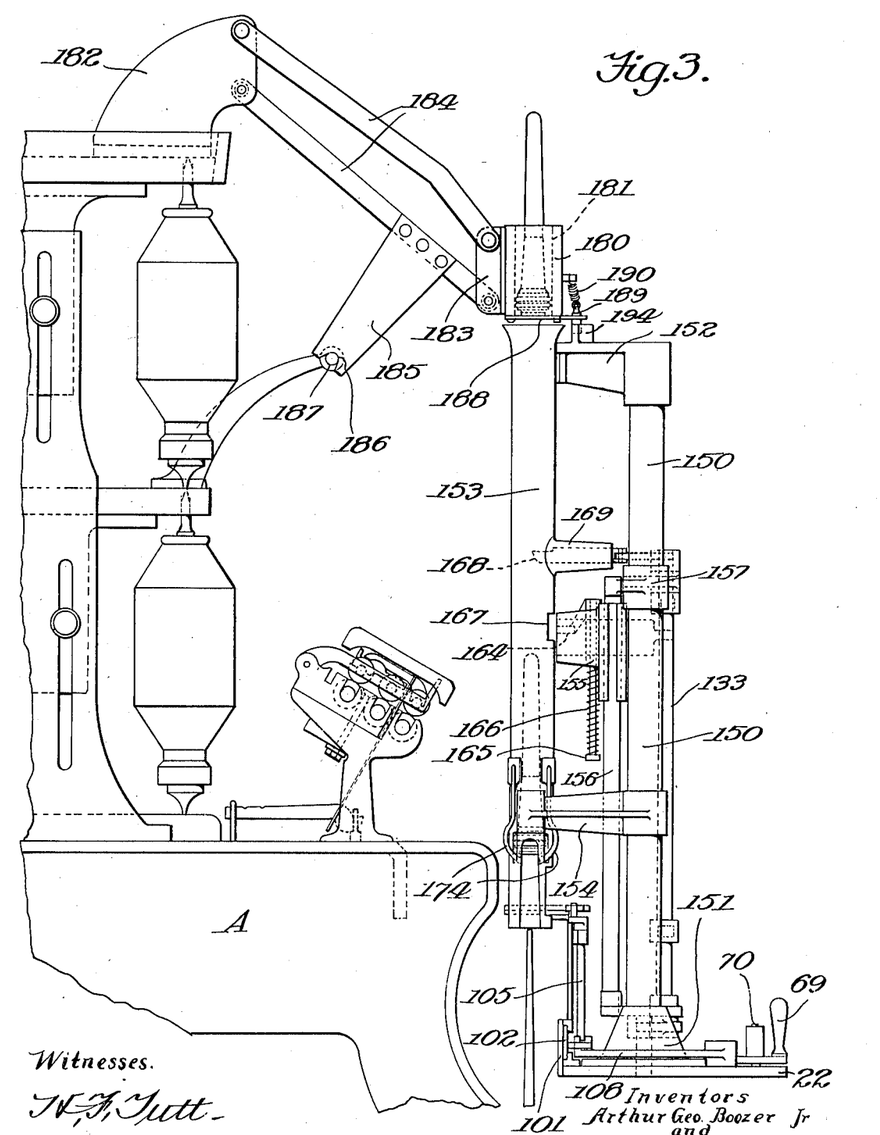
Figs. 3 and 4 taken together constitute a side elevation of the doffing machine and a fragmentary view of the spinning frame.

A link 26 connects arms 27 which are rigid with the bearings for the rollers, and said bearings are arranged to be rotated by means of a handle 28 (Fig. 2) to raise and lower the rollers with relation to the doffer frame.

A pair of rollers 29 and 30 are mounted respectively in brackets 31 and 32 on the sides 20, said latter rollers being arranged to bear against the lower flange of the spindle rail of the spinning frame, the weight of the doffer maintaining the rollers in contact with said spindle rail.

Figure 1:
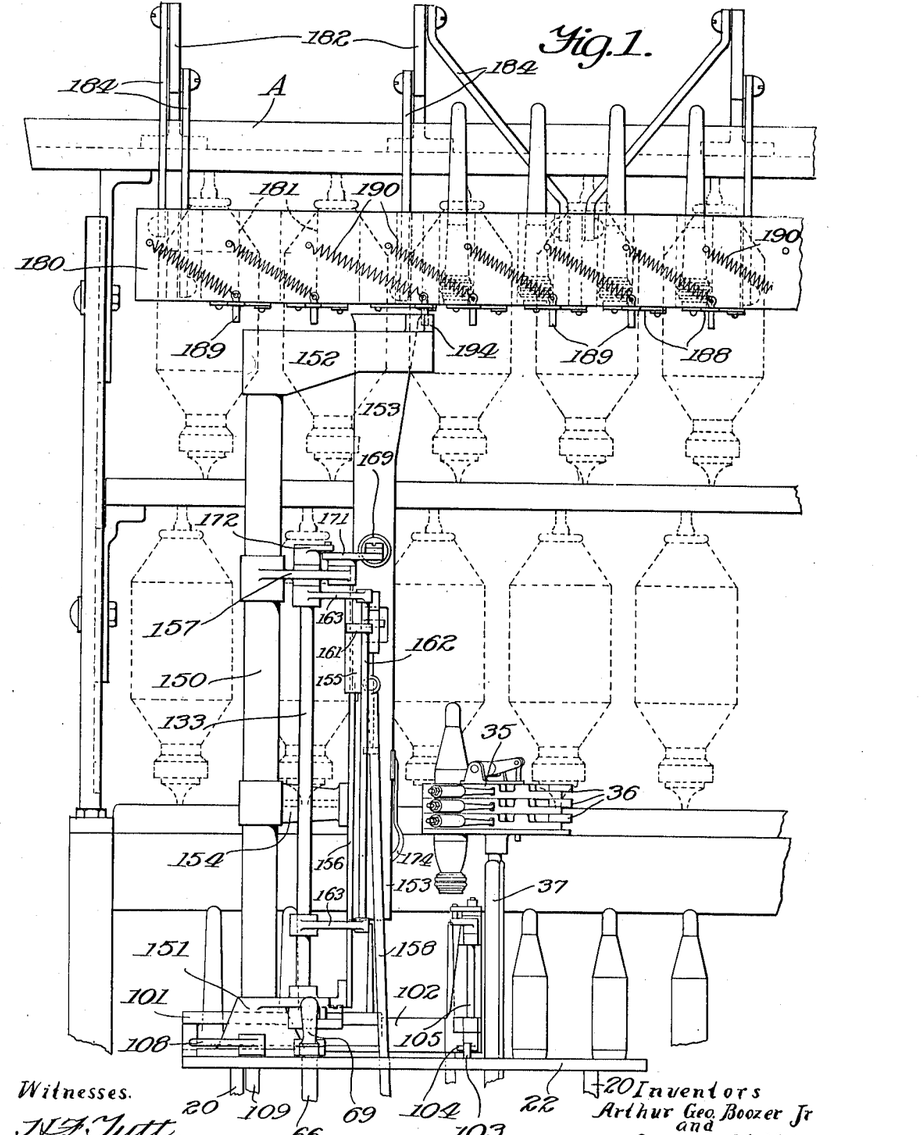

The doffer head 35 herein shown (see Fig. 1) for grasping the full bobbins and removing them from the spindles is substantially the same construction as that illustrated in our application Serial No. 621,317 above mentioned. Said head consists of a plurality of intermeshing spring-pressed fingers 36 extending in opposite directions from the center of the head to form two opposed gripping jaws. These jaws are alternately opened and closed by means fully described in said application. The doffer head is fixed upon the upper end of a bar 37 which is slidably mounted in a bearing carried by the table 22 and in a bearing 38 carried at the upper end of a guide member 39 fixed in the framework (see Fig. 2). The lower end of the doffer bar 37 is rotatably mounted in a slide 40 which is grooved to engage with the edges of the guide member 39, whereby the doffer head is guided for vertical reciprocating movement. Said head is reciprocated by means of a lever 41 pivoted at 42 in the bracket 31 and connected at its free end by means of a link 43 to the slide 40. The lever 41 is oscillated to reciprocate the doffer head by means to be now described.

Figures 4, 5, 6:
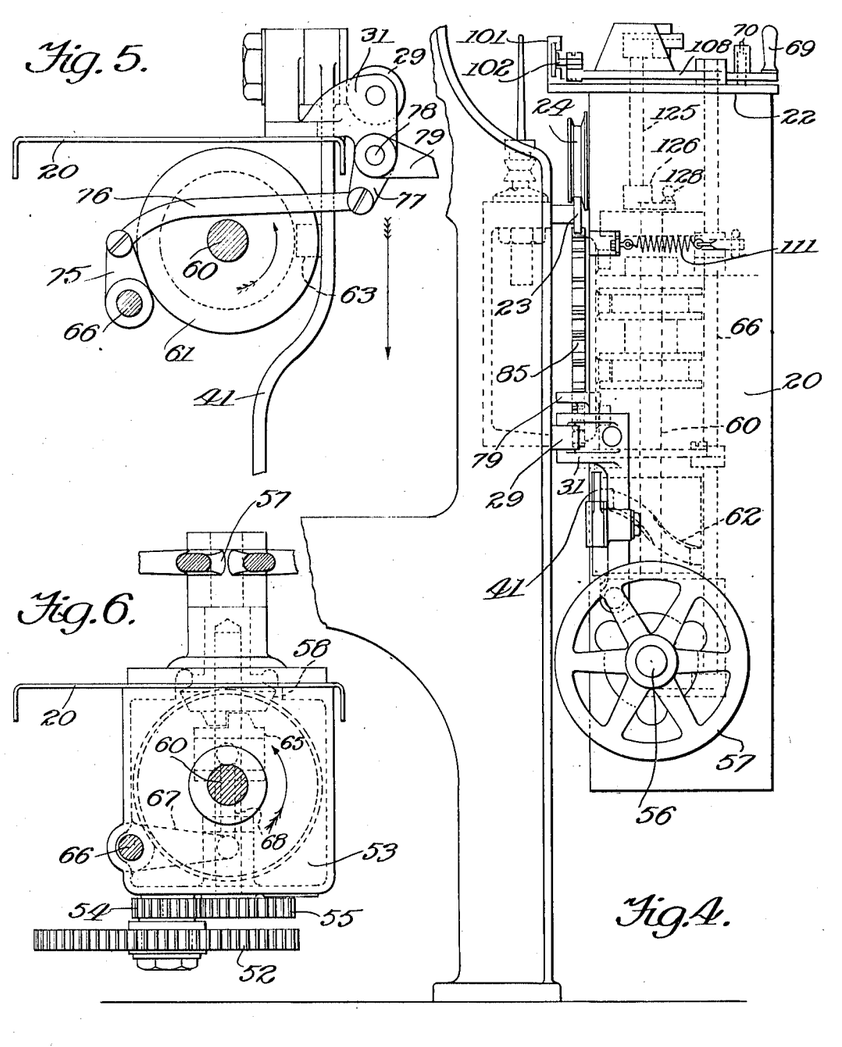
Figs. 5 and 6 are sectional detail views taken on lines 5 5 and 6 6, respectively, of Fig. 2.

An electric motor 50 is mounted on the base 21 and has a pinion 51 on its armature shaft which meshes with a gear 52 fixed on a stub shaft which is mounted in a bearing bracket 53 carried by one of the sides 20. (See Figs. 2 and 6.) A pinion 54, also fixed on the latter shaft, meshes with a spur gear 55 which is fixed on a horizontal shaft 56 also mounted in the bracket 53. Loosely mounted upon the shaft 56 at the outer side of the frame side 20 is a hand wheel 57.

A bevel pinion 58 is fixed with relation to the hand wheel 57, being loose on the shaft 56. Said pinion meshes with a bevel gear 59 fixed on the lower end of a vertical shaft 60, which is the main actuating shaft of the doffing machine. The lower end of said shaft is mounted in the bearing bracket 53.

A cam 61 has a groove 62 therein in which a roller stud 63 fixed to the lever 41 is arranged to travel, whereby the doffer head will be reciprocated.

A clutch-sleeve 65 is slidably but non-rotatably mounted on the shaft 56 and has a clutch face arranged to be moved into driving engagement with a clutch on the bevel pinion 58. A vertical controlling staff 66 has its lower end mounted in the bracket 53 and has fixed upon said lower end an arm 67 (Fig. 6) which is connected to the clutch-sleeve 65 by means of a link 68, whereby when the staff is rotated the clutch-sleeve 65 will be moved into and out of driving engagement with the pinion 58. When said clutch sleeve is out of such engagement, the main drive shaft 60 may be rotated by the hand wheel 57. The upper end of the controlling staff 66 has a handle 69 fixed thereon above the table 22, said handle being held in proper position by a spring-pressed pin 70 (Fig. 10) mounted thereon and arranged to engage the table 22.

An arm 75 (see Fig. 5) fixed on the controlling shaft 66 is connected by a link 76 to an arm 77 which is fixed on a pin 78 mounted in the bracket 31.

A dog 79 fixed on said pin, so as to be rigid with the arm 77 is arranged to engage a suitable projection stationarily mounted on the spinning frame near one end thereof, so that when the doffing machine reaches the end of its travel, said projection will engage the dog 79 and through the link 76 will rotate the controlling staff 66 and cause the driving motor to be disconnected from the actuating mechanism.

Figure 13:
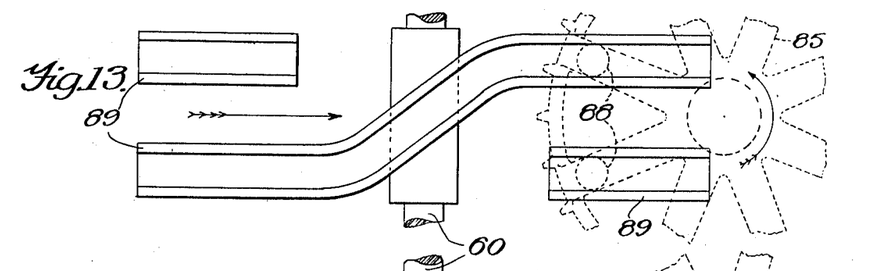
Figs. 13 and 14 are diagrammatic views illustrating the development of a cam which advances the doffing machine step by step along the spinning frame.
Figure 14:
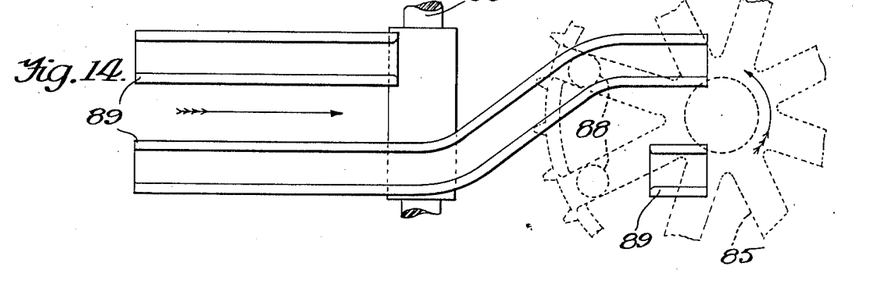
Figure 15:
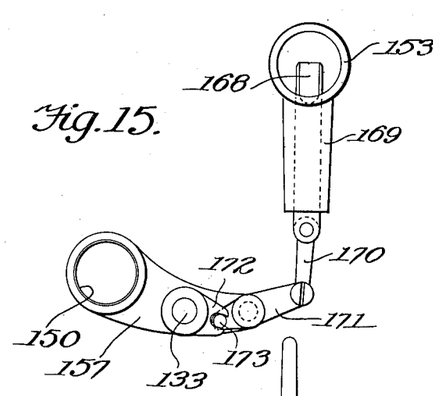
Figs. 15 and 16 illustrate, in two different positions, a means for controlling the descent of the empty bobbins in the donning tube.
Figure 16:
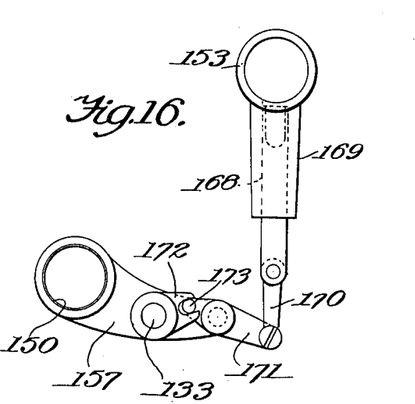

The doffing machine is moved step by step along the spinning frame by means of a toothed wheel 85 (Fig. 2) fixed on the rear end of a horizontal shaft 86, said wheel being arranged to interengage with notches or recesses in the lower edge of the guide-rail 23. The shaft 86 is mounted in a bearing in the central portion of a U-shape bracket 87 which has its ends fixed to one of the sides 20 of the frame. On one side of the toothed wheel 85 is mounted a series of roller studs 88 which are arranged to enter the groove in a cam 89 which is fixed on the main actuating shaft 60. The contour of said cam is illustrated in Figs. 13 and 14. The cam groove is open at opposite ends and said ends lie in different horizontal planes, the groove having an inclined portion between said ends. As the actuating shaft 60 is rotated, the cam 89 will successively engage the roller studs 88 on the wheel 85 and thus rotate the wheel step by step.

Upon the forward end of the shaft 86 is fixed a bevel gear 90 (Fig. 2) which meshes with a bevel pinion 91 fixed on the lower end of the vertical shaft 92, which shaft is mounted in the bracket 87 and in the table 22. On the upper end of the latter shaft is fixed a bevel gear 93 which meshes with a bevel pinion 94 fixed on a short horizontal shaft which is mounted in a bearing 95 upon the lower side of the table 22. The opposite end of the last mentioned shaft has a bevel gear 96 fixed thereon which gear meshes with a bevel gear 97 which is rotatably supported beneath the table 22. The doffer bar 37 extends slidably but non-rotatably through said gear 97. The step by step rotation of the driving wheel 85 causes intermittent rotation of the doffer bar 37 to move the doffer head periodically through one hundred eighty degrees.

Figures 9, 10:
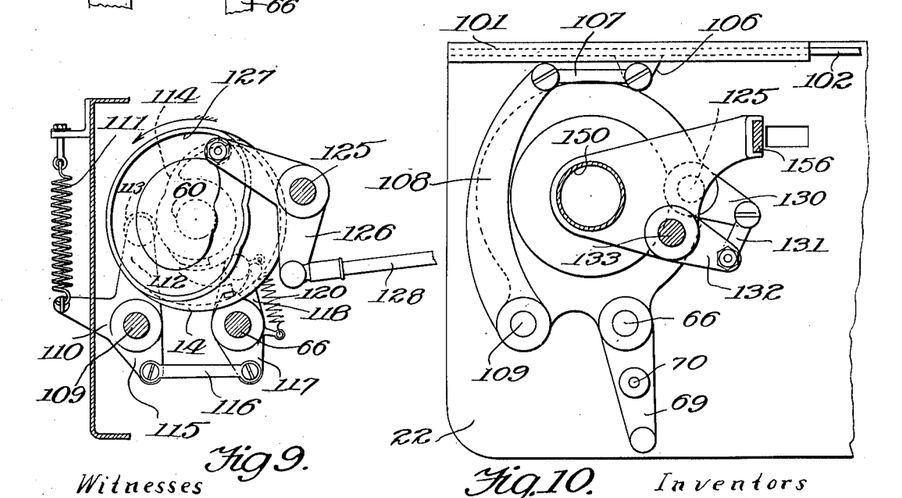
Fig. 9 is a horizontal section on line 9 9 of Figs. 2 and 7, showing the contour of a cam comprised in the actuating means.
Fig. 10 is a horizontal section in the plane of line 10 10 of Fig. 7.
Figure 11:
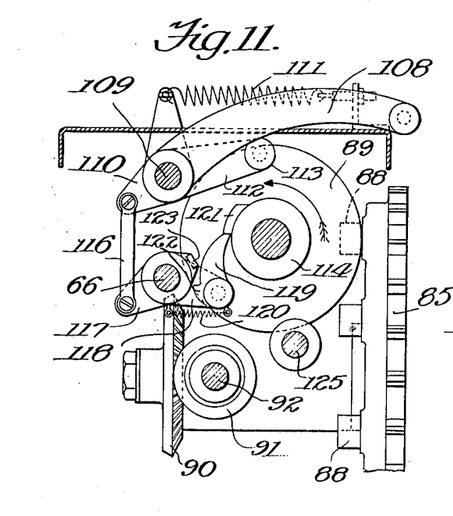
Figs. 11 and 12 are horizontal sectional views illustrating, in two different positions, a means for automatically disconnecting the driving motor from the operating mechanism.
Figure 12:
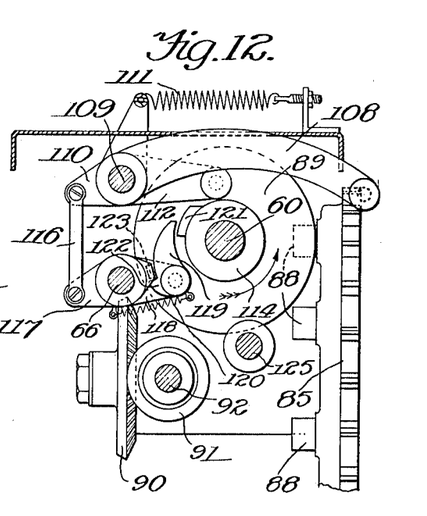

When a full bobbin is lifted off from its spindle by means of the doffer head, the thread running from the bobbin to the spindle is severed by cutting mechanism (see Figs. 1, 3, 8 and 10) which may be substantially similar to the cutting mechanism shown in our applications above alluded to. Said mechanism comprises a guideway 101 fixed on the upper side of the table 22, a slide bar 102 horizontally movable in said guideway, and cutting means carried by said slide bar and actuated by a stationary pin 103 which engages an arm 104 on a rock shaft 105 mounted on said bar, said rock shaft actuating the movable cutting device. The slide bar has a lug 106 thereon which is connected by a link 107 with a free end of a horizontally swinging arm 108 which is fixed on the upper end of a vertical shaft 109. A lever 110, best shown in Figs. 9, 11 and 12, is fixed on this shaft near its lower end, and said lever has a tension spring 111 connected thereto and to a bracket on the framework, whereby the shaft and arm tend to swing in the direction to move the cutter slide forwardly and cause the cutting means to sever the thread running from the bobbin to the spindle. An arm 112 of the lever 110 carries a roller 113 which is held against one face of a cam member 114 which is fixed upon the main actuating shaft 60. An arm 115 of the lever 110 is connected by means of a link 116 to an arm 117 which is loosely mounted upon the controlling staff 66. Another arm 118 is rigidly mounted upon said staff beneath the arm 117, the former arm having pivoted thereon a pawl 119. A coiled spring 120, attached at one end to a pin fixed to the arm 118 and its other end to the pawl 119, tends to move said pawl into engagement with a lug 121 upon the hub of the cam member 114.

The pawl 119 has a tail 122 which is arranged to be engaged by a depending lug 123 on the arm 117 each time the cutter slide advances, whereby the pawl is moved out of position to be engaged by the lug 121. In the rotation of the cam member 114 the roller on the arm 112 follows the contour of its cam, so as to permit the spring 111 to swing the arm 108 to slide the cutting device at the proper moment. In case a bobbin is not removed from its spindle, the bobbin will be in position to obstruct the movement of the cutting device, so that unless means were provided to prevent it, breakage of some of the parts might occur as the doffing machine advances. As will be seen, with the construction just described, if the movement of the cutter slide is obstructed by failure of the doffer head to remove a bobbin or in any other way, the shaft 109 will be affected and this will prevent the arm 117 from withdrawing the pawl 118 out of position to be engaged by the lug 121. Therefore said lug 121 will engage the pawl in the rotation of the cam member 114 and will rotate the arm 118 and the staff 66 to throw out the clutch 65 and thus disconnect the actuating mechanism from the driving motor 50.

Figure 7:
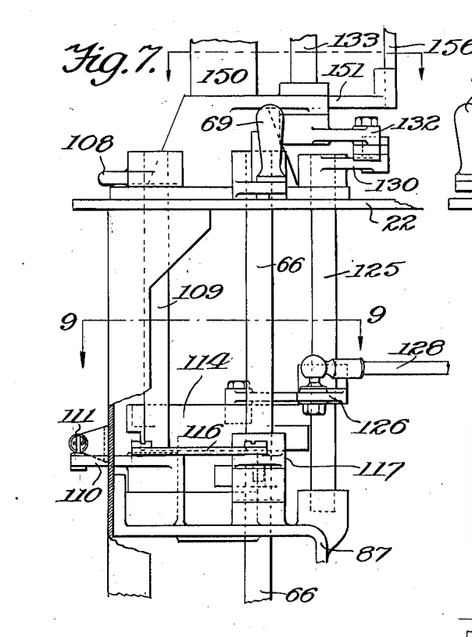
Fig. 7 is a fragmentary front elevational view and Fig. 8 a front-to-rear sectional view, with parts omitted, illustrating certain mechanism at the central portion of the machine.
Figure 8:
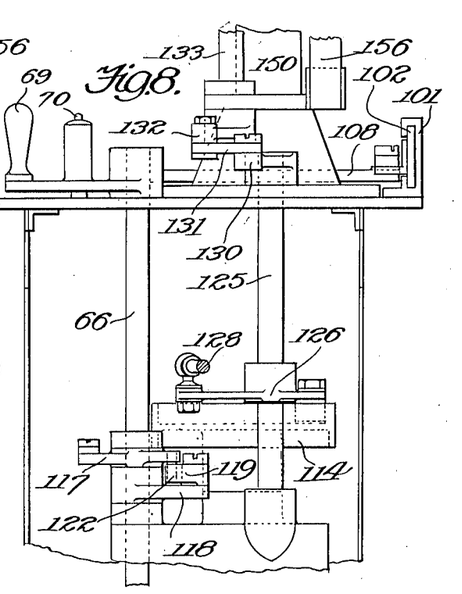

A vertical rock-shaft 125 has fixed thereon a bell-crank lever 126, (Figs. 2, 7 and 9) one arm of which carries a roller traveling in a groove 127 in the upper face of the cam member 114, the other arm being connected by a link 128 to a bell-crank lever 129 which projects up through an opening in the table 22 and opens and closes the doffer head. On the upper end of the shaft 125 is fixed an arm 130 which is connected by a link 131 to an arm 132 fixed on the lower end of a rock-shaft 133 (Figs. 1, 7, 8 and 10) which actuates the mechanism for controlling the descent of the bobbin in the donning tube. The contour of the cam groove 127 is such as to impart the proper rocking movement to the shaft 125.

A vertical standard 150 (Figs. 1 and 3) has its lower end seated in a bracket 151 secured to the table 22, and this standard has fixed on its upper end a bracket 152 in which is mounted the upper end of the donning tube 153 which guides the empty bobbins onto the spindles. A bracket 154, mounted on the standard 150, assists in supporting the donning tube.

After the empty bobbins have been deposited on the spindles they are pressed down or seated on the spindles. This seating means is generally similar to that shown in our prior applications above mentioned, and comprises a slide 155 mounted to reciprocate on a vertical guide bar 156 having its ends attached to the bracket 151 and a bracket 157 on the standard 150. The slide 155 is arranged to be reciprocated by means of a link 158 attached thereto, the lower end of said link being connected to one end of a lever 159 which is pivoted between its ends on the slide 40 for the doffer head. (See Fig. 2.) The other end of said lever is attached by means of a link 160 to the oscillatory arm or lever 41 which reciprocates the doffer head. A second slide 161 is horizontally reciprocable in the slide 155 and is arranged to be slid by a vertical rod 162 passing loosely through an opening in the slide 161 and having its ends fixed in a pair of arms 163 which are fixed on the rock shaft 133. A bobbin-seating plate 164 is carried by a rod 165 which is mounted for vertical movement in the horizontal slide 161, said rod being normally pressed downwardly by a coiled spring 166 surrounding it. When the vertical slide 155 is at the upper end of its movement, the shaft 133 is rocked to move the bobbin seater 164 into the donning tube 153 through an opening 167 therein. As the slide 155 is moved downwardly, said bobbin seater travels in a slot in the donning tube and is withdrawn by movement of the arms 163 when the slide reaches the lower end of its movement, the bobbin seater traveling on the outside of the donning tube during the upward movement of the slide 155. The length of travel of the bobbin-seating device is greater than that of the doffing means. The lever 159 and link 160 are so mounted and connected that in the reciprocation of the slide 40, the end of the lever 159 to which the link 158 is attached will move through a greater vertical distance than said slide 40.

A stop 168 is slidably mounted in a bearing 169 on the donning tube 153 for movement into and out of the tube, (see Figs. 1, 3, 15 and 16) the outer end of said stop being connected by a link 170 to a lever 171 which is pivoted between its ends on the bracket 157. An arm 172 is fixed on the upper end of the rock-shaft 133 and is notched to receive a pin 173 which is fixed in the lever 171 upon the opposite side of its pivot from the link 170. When the rock-shaft 133 is swung to move the bobbin seater 164 into the donning tube, the stop 168 is simultaneously withdrawn from said tube. At the lower end of the donning tube 153 are a suitable number of spring fingers 174 extending into the tube and arranged to support a bobbin and to yield to permit the bobbin to be forced past them.

The magazine 180 for empty bobbins (see Figs. 1, 3, 17, 18 and 19) comprises a member having a plurality of spaced vertical openings 181 therethrough each adapted to receive a single bobbin in an upright position. Said member may be substantially the same length as the spinning frame. The magazine is supported by a series of brackets 182 which are fixed upon the spinning frame and are connected with brackets 183 fixed on the magazine by means of pairs of parallel links 184. The magazine is thus held at all times in upright position. Stop plates 185 are fixed to certain of the links 184, (see Fig. 3) said plates having notches 186 therein to receive a rod 187 on the spinning frame, whereby the magazine will be supported in its lowermost or operative position. The lower ends of the bobbin recesses 181 in the magazine are normally closed, or partially so, to prevent the escape of bobbins from the magazine, by means of a series of plates 188 pivoted on the under side of the member 180. In the forward ends of each of said plates is fixed a pin 189, the upper end of which is connected by a coiled spring 190 to a stationary pin 191 in the magazine, whereby the plate 188 is normally held in its closing position. A pin 192 extending through an arcuate slot 193 in the plate 188 and fixed in the lower face of the magazine determines the limit of swinging movement of the plate. A cam member 194 fixed upon the top bracket 152 of the doffing machine is arranged to move successively into engagement with the lower ends of the pins 189 as the doffing machine travels along, so as to swing the plates 188 to permit the descent of the bobbins successively from the magazine into the donning tube 153.

In use, the machine is lifted into engagement with the guide rail 23 and the bolster rail, and the mechanism is adjusted by rotating the hand wheel 57 to position the doffer head at the upper end of its movement ready to descend upon the full bobbin beneath it. The bearings for the upper supporting rollers 24 are then rotated by the handle 28 to raise the framework and carry the toothed driving wheel 85 into engagement with the guide rail 23. The clutch 65 is now shifted to connect the motor with the operating mechanism.

In the operation of the machine, the doffer head 35 is caused to descend and grip a full bobbin on one of the spindles, the bobbin seater 164 being simultaneously moved downwardly in the donning tube to engage the upper end of a previously deposited empty bobbin and press it down on its spindle. The doffer head is then moved upwardly carrying with it the full bobbin which it has engaged, and the bobbin seater is at the same time moved upwardly on the outside of the donning tube. When the doffer head approaches the upper end of its movement so that the bobbin carried thereby has cleared its spindle, the cam 89 engages one of the studs on the toothed driving wheel 85 and advances the doffing machine one step, the distance of each advancing movement being the distance between two adjacent spindles. While the doffer head is in such elevated position, it is rotated through 180 degrees, by the means hereinbefore described, so as to bring the opposite gripping jaw in position to descend over the succeeding bobbin. When the doffer head is at its lower limit of movement, the bell-crank lever 129 is swung to close one gripping jaw about the full bobbin which it surrounds and to open the opposite jaw so as to release the previously removed full bobbin still retained therein. This released bobbin descends through a suitable chute 195 (Fig. 2) into a receptacle not shown in the drawings.

In each advancing movement of the machine the cam 194 at the upper end thereof will engage and swing aside one of the plates 188 on the magazine to permit the bobbin supported thereby to descend into the donning tube 153. The descent of this bobbin will be arrested by the stop 168 which at this time projects into the donning tube. When the bobbin seater is moved horizontally into the donning tube, the stop 168 is withdrawn, and the bobbin supported thereon will descend onto the bobbin seater 164 and will travel downwardly therewith until arrested by the spring fingers 174 at the lower end of the tube. When the bobbin seater has seated the previously deposited bobbin, it is moved horizontally out of the donning tube and upwardly at the outside of said tube and finally horizontally into the donning tube above the bobbin held by the spring fingers 174, the latter bobbin being forced past said fingers and onto the spindle by the bobbin seater in its next descent. The lever 159 and links 158 and 160 give the bobbin seating means a longer vertical reciprocation than is imparted to the doffer head. When the bobbin seater engages a bobbin to seat it on its spindle, the spring 166 permits the seater to yield upwardly to prevent breakage.

Figures 17, 18, 19:
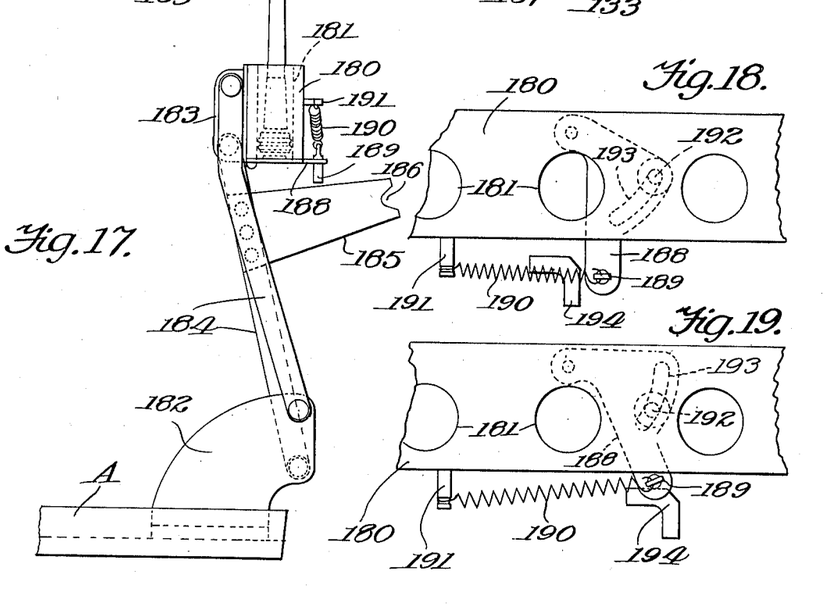
Fig. 17 is an end elevation of the empty bobbin magazine and the supporting means therefor.
Figs. 18 and 19 are fragmental plan views of the bobbin magazine and the means for controlling the discharge of bobbins therefrom.

When the empty bobbin magazine is not in use it may be raised into the position illustrated in Fig. 17 and, if desired, the upper links 184 may be bent to permit the magazine to swing over center as shown, so that it will be held by gravity in its elevated position.

The machine may be quickly stopped at any time by operating the handle 69, and it will be automatically stopped when it reaches the end of the spinning frame or in case the cutter device engages an improperly seated bobbin.

We recognize the fact that various modifications in structure may be made without departing from the spirit and scope of our invention, and therefore we do not limit ourselves to the exact construction herein disclosed.

We claim as our invention:

1. In a doffing machine, the combination of a framework, a drive shaft mounted therein, a main actuating shaft disposed vertically in said framework and operatively connected to said drive shaft, a cam fixed on said actuating shaft, a lever pivoted in said framework and carrying a roller stud engaging said cam, and vertically reciprocating doffing means attached to said lever.

2. In a doffing machine, the combination of a framework, an electric motor mounted therein, a main shaft vertically disposed in said framework and operatively connected to said motor, a cam fixed on said shaft and having a peripheral cam groove, doffing means mounted in said framework for vertical reciprocation, and a lever pivoted at one end in said framework and attached at its other end to said doffing means, said lever having a roller stud running in the groove in said cam.

3. In a doffing machine, in combination, a framework mounted to travel, a main actuating shaft vertically disposed in said framework, doffing means and framework-propelling means mounted in the framework and driven from said shaft, a short horizontal driving shaft mounted in the framework near the lower end of said actuating shaft, intermeshing bevel gears on said shafts, a hand wheel loose on the outer end of said horizontal shaft, and rigid with the bevel gear on said shaft, and a hand operable clutch mounted on said horizontal shaft whereby the latter bevel gear may be connected to and disconnected from said horizontal shaft, said hand wheel serving to operate the mechanism of the machine when said clutch is disconnected.

4. In a doffing machine, the combination of a framework mounted to travel, a main actuating shaft vertically disposed in said framework, doffing means and framework-propelling means mounted in the framework and driven from said shaft, a short horizontal driving shaft mounted in said framework near the lower end of said actuating shaft, intermeshing bevel gears on said shafts, a hand wheel fixed to the gear on said horizontal shaft for rotating the parts, and a clutch arranged to connect said horizontal shaft to the gear thereon.

5. The combination with a spinning frame, of bobbin-placing mechanism arranged to travel horizontally along said frame, a magazine for empty bobbins mounted above and independently of said bobbin-placing mechanism, said magazine extending substantially along the entire length of the spinning frame and having a series of independent vertical pockets each adapted to receive a bobbin, and means for successively effecting the withdrawal of bobbins from the magazine for presentation to said bobbin-placing mechanism.

6. In a doffing machine, the combination of a supporting framework mounted to travel along a spinning frame, doffing means and framework-propelling means mounted in the framework, driving means, clutch means to connect the driving means to said doffing and propelling means, a vertically positioned staff mounted in the framework for rotation about its longitudinal vertical axis, said staff being arranged to operate said clutch means, a handle on said staff to permit manual operation thereof, and means for automatically rotating the staff under certain conditions.

7. In a doffing machine, the combination of a framework, a main actuating shaft disposed vertically therein, doffing means, a pivoted lever for operating the latter, a cam fixed on said shaft for actuating said lever, a toothed wheel adapted to engage a stationary portion on the spinning frame for advancing the machine along said frame, and a second cam fixed on said shaft and arranged to engage portions on said wheel for intermittently rotating the latter.

8. In a doffing machine, the combination of operating mechanism including thread-severing means, means for driving said operating mechanism, clutch means in the lower portion of the machine for connecting said driving means to said operating mechanism, a vertical rock shaft connected at its lower end to said clutch means, means for causing said thread-severing means to periodically advance to sever a thread, and means operable when said thread severing means is obstructed for rotating said rock shaft to disengage said clutch means.

9. In a doffing machine, in combination, a clutch, a rock shaft for operating said clutch, a continuously rotating member having a projection thereon, an arm fixed on said rock shaft and having a spring-pressed pawl tending to move into position to be engaged by said projection, a second arm loosely mounted on said rock shaft and having a projection engaging said pawl to move it out of the path of said projection, and thread-severing means governing the movement of the second mentioned arm.

10. In a doffing machine, the combination of clutch means for connecting the power to the operating mechanism, a vertical rock shaft for operating said clutch means, reciprocatory thread-severing means, a vertical shaft having an arm connected to said thread-severing means, a lever fixed on the last-mentioned shaft, a cam and spring for actuating said lever in opposite directions, said cam having a projection thereon, an arm loosely mounted on said rock shaft and connected to said lever, an arm fixed on said rock shaft, and a spring-pressed pawl mounted on the last-mentioned arm and normally tending to move into the path of the projection on said cam, the first-mentioned arm on said rock shaft normally holding said pawl out of said path.

11. A doffing machine arranged to travel along a spinning frame and having a horizontally slidable thread-severing means, a vertical shaft, a horizontal arm fixed on the upper end of said shaft and connected to said thread-severing means, and means for rocking said shaft.

12. In a doffing machine, in combination, a framework including a horizontal table, operating mechanism, driving means, clutch means to connect said driving means to said operating mechanism, a vertical staff connected at its lower end to said clutch means and having a handle on its upper end near said table, a pivoted dog operatively connected to said staff and arranged to engage a projection on a spinning frame for throwing out said clutch means, and means connected to said staff and operable when a portion of the operating mechanism is obstructed for throwing out said clutch means.

13. In a doffing machine, in combination, a donning tube, and bobbin-seating means including a vertical slide and a horizontal presser plate slidable in said vertical slide, a vertical rock shaft connected to said presser plate for horizontally moving it, a dog above said presser plate arranged to be moved into and out of said donning tube, and means connecting said dog to said vertical shaft, whereby movement of said shaft will withdraw said dog from the donning tube when the presser plate is inserted therein.

14. In a doffing machine, in combination, a vertical donning tube, a vertical slide outside of said tube, a presser plate horizontally movable in said slide into and out of said donning tube, a dog movable into and out of said donning tube, a vertical rock shaft connected to said presser plate for moving the latter, an arm on said rock shaft, and a lever pivoted between its end and connected to said dog, said lever having a pin and notch engagement with said arm.

15. The combination with a spinning frame, of bobbin-placing mechanism mounted to travel horizontally along said frame, a magazine for empty bobbins mounted above and independently of said bobbin-placing mechanism, said magazine comprising a long slender device extending substantially the length of the spinning frame and having a series of independent vertical pockets each adapted to receive a single bobbin, the magazine further having a series of individually withdrawable devices normally holding the bobbins in the magazine, and means traveling with said bobbin-placing mechanism and arranged to successively operate said devices to permit the escape of bobbins from the magazine.

16. The combination of a spinning frame, a doffing machine mounted thereon and having a donning tube, and a long slender bobbin magazine mounted on the spinning frame and extending substantially the entire length of the latter, said magazine having a plurality of individual vertical pockets each adapted to contain a bobbin in an upright position, said doffing machine being arranged to travel along the spinning frame beneath the magazine, and means for discharging the bobbins successively from the magazine into said donning tube.

17. The combination with a spinning frame having supporting means and a horizontal guide-rail mounted thereon, of bobbin-placing mechanism mounted to travel on said rail, a long slender bobbin magazine mounted on said supporting means above said bobbin-placing mechanism, said magazine having a series of bobbin pockets passing vertically therethrough and having withdrawable devices at the lower ends of said pockets normally supporting the bobbins, and means traveling with the bobbin-placing mechanism and arranged to successively operate said devices for permitting the escape of bobbins from the magazine.

18. A magazine for containing empty bobbins to supply doffing machines, comprising a long slender device having a single row of independent vertical openings therethrough, each adapted to receive a single bobbin in a vertical position, and individually withdrawable means closing the lower end of each of said openings.

19. The combination with a spinning frame, of a bobbin magazine extending longitudinally along said frame, and pairs of parallel links connecting said magazine to said spinning frame, the links of each pair being positioned one above the other.

20. The combination with a spinning frame, of an empty bobbin magazine extending longitudinally along said frame, pairs of parallel links connecting said magazine to said frame, the links of each pair being positioned one above the other, and means carried by certain of said links to engage said frame for supporting said magazine at the desired height.

21. The combination with a spinning frame having a row of spools and having a rod extending longitudinally of the frame in front of said spools, an empty bobbin magazine extending longitudinally along the frame in front of said rod, pairs of parallel links connecting said magazine to said frame, and a plate carried by one of said links and engaging said rod to support said magazine at the desired height.

22. The combination with a spinning frame, of an empty bobbin magazine arranged to contain bobbins in a vertical position, and pivotal means for supporting said magazine on the spinning frame, said means permitting vertical movement of said magazine and being arranged to maintain the bobbins therein in their vertical position during such movement.

23. The combination of a spinning frame, a doffing machine mounted thereon, a magazine mounted on the spinning frame above said doffing machine and having a plurality of vertical recesses extending therethrough and each adapted to contain a single bobbin, an individual spring-pressed closing plate at the lower end of each of said openings, and a cam carried by the doffing machine and arranged to move said plates to discharge the bobbins successively from the magazine.

24. A bobbin magazine for doffers having a row of independent vertical recesses extending therethrough and each adapted to contain a single bobbin, a series of plates each horizontally pivoted at the under side of the magazine and closing one of said openings, and coiled springs each adapted to hold one of said plates in its closed position.

25. The combination of a spinning frame, a magazine mounted thereon and having a row of vertical openings therethrough each adapted to contain a single bobbin, a series of plates pivoted at the under side of the magazine for horizontal movement and each adapted to close one of said openings, springs for holding said plates in their closing position, a doffing machine mounted on the spinning frame to travel longitudinally along said frame and beneath said magazine, and a cam on said doffing machine arranged to successively engage said plates for discharging the bobbins from the magazine into the doffing machine.

26. An empty bobbin magazine for doffers comprising a long slender device arranged to be mounted on a spinning frame and extending longitudinally along one side and substantially the entire length thereof, said device having a single row of vertical openings therethrough, each adapted to receive a single bobbin, a series of plates pivoted to the under side of said device for movement in a horizontal plane, said plates being arranged to close the lower ends of said openings, springs normally holding said plates in their closing position, and means limiting the swinging movement of said plates.

27. The combination of a spinning frame, a doffing machine mounted thereon to travel along one side thereof, said doffing machine having a donning tube, a long slender magazine having a single row of independent vertical openings therein to receive bobbins, means to hold the bobbins in the magazine and to discharge them at times into said donning tube, and pairs of parallel links connecting said magazine to said spinning frame and permitting vertical movement of the magazine.

28. In a doffing machine, in combination, doffing means and a bobbin-seating device mounted for reciprocation, a lever for reciprocating said doffing means, a second lever mounted on said doffing means, a link connecting said second lever to said bobbin-seating device, and a link connecting said second lever to the first lever.

29. In a doffing machine, in combination, a vertically reciprocatory bobbin-seating device, vertically reciprocating doffing means, means for actuating said doffing means, a lever mounted on said doffing means and connected to said bobbin-seating device, and a connection between said lever and said actuating means.

30. In a doffing machine, in combination, doffing means including a vertically reciprocatory slide, a pivoted lever arranged to reciprocate said slide, a vertically reciprocatory bobbin-seating device, a lever pivoted on said slide, a link connecting the last-mentioned lever to said bobbin-seating device, and a connection between said two levers.

31. In a doffing machine, in combination, doffing means including a vertically reciprocatory slide, a lever pivoted at one end, a link connecting the other end of said lever to said slide, a vertically reciprocatory bobbin-seating device, a second lever pivoted between its ends on said slide, a link connecting one end of the second lever to said bobbin-seating device, and another link connecting the opposite end of the second lever to the first-mentioned lever.

In testimony whereof we affix our signatures in the presence of two witnesses.

ARTHUR GEORGE BOOZER, Jr.
GEORGE HILL.

Witnesses:
H. B. INGRAM,
J. T. SOUTHERN.